US006877476B1

(12) United States Patent
Bradsen

(10) Patent No.: US 6,877,476 B1
(45) Date of Patent: Apr. 12, 2005

(54) INTERNAL COMBUSTION ENGINE

(75) Inventor: Ross Bradsen, Huntsville (CA)

(73) Assignee: Indexica, Ltd., Huntsville (CA)

( * ) Notice: Subject to any disclaimer, the term of this patent is extended or adjusted under 35 U.S.C. 154(b) by 0 days.

(21) Appl. No.: 10/682,143

(22) Filed: Oct. 9, 2003

(51) Int. Cl.[7] ........................... F02B 53/04; F16C 33/18

(52) U.S. Cl. ....................... 123/231; 123/241; 384/300; 427/376.1; 428/539.5

(58) Field of Search ................................ 123/231, 241, 123/246, 249; 384/300; 427/376.1; 428/539.5; F16J 1/01, 1/02, 1/62

(56) References Cited

U.S. PATENT DOCUMENTS 985,907 A * 3/1911 Jones ......................... 123/249
3,117,562 A * 1/1964 Hajet ......................... 123/246
3,472,210 A * 10/1969 Savoie, Jr. .................. 123/246
3,765,378 A * 10/1973 Waldrum .................... 123/246
3,865,086 A * 2/1975 Lee ............................ 123/241
4,274,374 A * 6/1981 Lee ............................ 123/241
4,404,262 A * 9/1983 Watmough ............... 428/539.5
4,571,946 A * 2/1986 Demopoulos ................ 60/618
4,615,171 A * 10/1986 Burk ........................... 384/300
4,712,600 A * 12/1987 Hamajima et al. ............ 164/97
4,976,550 A * 12/1990 Shobert ....................... 384/300
5,525,374 A * 6/1996 Ritland et al. ........... 427/376.1

FOREIGN PATENT DOCUMENTS

JP 54151715 A * 11/1979 ............. F02F/3/14
JP 58180751 A * 10/1983 .............. F16J/1/02
JP 05263932 A * 10/1993 .............. F16J/1/01
JP 07233727 A * 9/1995 ........... F02B/23/06
SU 932032 B * 5/1982 .............. F16J/1/06

* cited by examiner

*Primary Examiner*—Thomas Denion
*Assistant Examiner*—Thai-Ba Trieu
(74) *Attorney, Agent, or Firm*—Harness, Dickey & Pierce, PLC

(57) ABSTRACT

An apparatus that can be utilized as an internal combustion engine, a compressor, a pump or the like has an indexer which defines a plurality of slots. A pinwheel has a plurality of pins which, when the pinwheel and the indexer are rotated, engaged a respective slot to form a compression chamber. As rotation of these two components continues, each pin sequentially engages a slot to continuously form compression chambers.

40 Claims, 11 Drawing Sheets

INTERNAL COMBUSTION ENGINE

FIELD OF THE INVENTION

The present invention relates to internal combustion engines. More particularly, the present invention relates to an internal combustion engine which utilizes a pinwheel engaged with a slotted disc to define the compression chambers of the internal combustion engine.

BACKGROUND OF THE INVENTION

The transportation industry, as well as other numerous industries, rely on the internal combustion engine as a source of power. The typical internal combustion engine employs one or more cylinders having pistons reciprocating therein. The reciprocating motion of the pistons defines an intake stroke, a compression stroke, a power stroke, and an exhaust stroke. A mixture of air and fuel is directed into the cylinder through an intake valve during the intake stroke; the air and fuel mixture is compressed during the compression stroke; the air and fuel mixture is ignited and burns during the power stroke; and, finally, the exhaust gases are exhausted from the cylinder through an exhaust valve during the exhaust stroke.

Engine speed, power, fuel consumption and emissions are typically controlled by manipulating various parameters associated with the engine. These parameters include, but are not limited to, fuel injection pressure, ignition timing, induction throttling, exhaust gas recirculation, air injection, displacement on demand systems, and induction charging. Various sensors monitor the operating conditions of the engine and these sensors provide feedback to an engine control unit (ECU) that, in turn, adjusts the parameters associated with the engine.

Typical engine configurations include V-shaped engines, in-line engines, 2-cycle engines, 4-cycle engines, gasoline engines, natural gas engines, diesel engines, and the like. While each of these engines or combination of engines has proven performance in today's applications, the continued development of internal combustion engines includes the development of engines that have improved performance, reliability and efficiency with lower emissions, and preferably have fewer components and are less costly to produce.

SUMMARY OF THE INVENTION

The present invention provides the art with an engine configuration that can operate over a broad-speed range; it can take advantage of the Atkinson cycle; it has all rotary moving parts; and it has a combustion chamber having a low surface-to-volume ratio. The present invention also provides a compact, lightweight engine that can accommodate gas direct injection (GDI) and allows for adjustable injector positioning.

The engine of the present invention utilizes a pinwheel engaged within a slot formed in a disc. The pinwheel and the disc rotate together such that the pin of the pinwheel moves laterally within the slot to define the compression chamber. The engine delivers improved performance, reliability and efficiency with lower emissions than the current state-of-the-art engine configurations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 18 is a cut-away view illustrating a portion of the indexer illustrated in FIGS. 15 and 16.

DETAILED DESCRIPTION OF THE PREFERRED EMBODIMENTS

Figure 1:
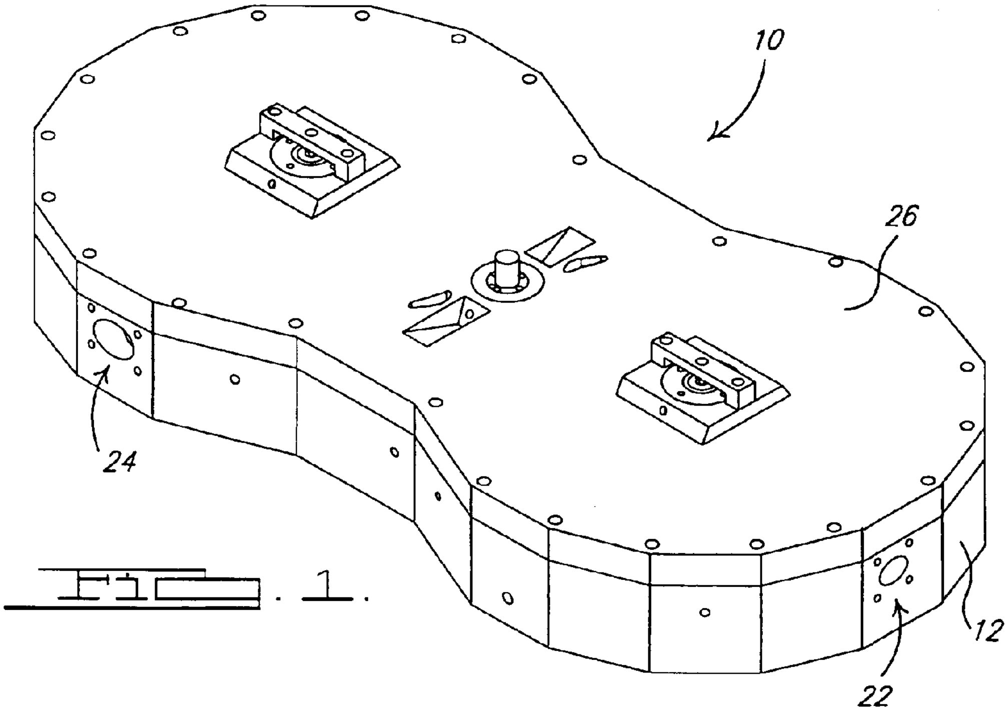
FIG. 1 is an isometric view illustrating an assembled engine in accordance with the present invention.

The following description of the preferred embodiment(s) is merely exemplary in nature and is in no way intended to limit the invention, its application, or uses.

There is shown in FIGS. 1–7 an internal combustion engine in accordance with the present invention and which is indicated generally with reference numeral 10. Engine 10 comprises an outer housing 12, a pair of pinwheels 14, an indexer or slotted disc 16, a fuel injection system 18, an ignition system 20, an intake system 22, an exhaust system 24, and a cover 26.

Figure 2:
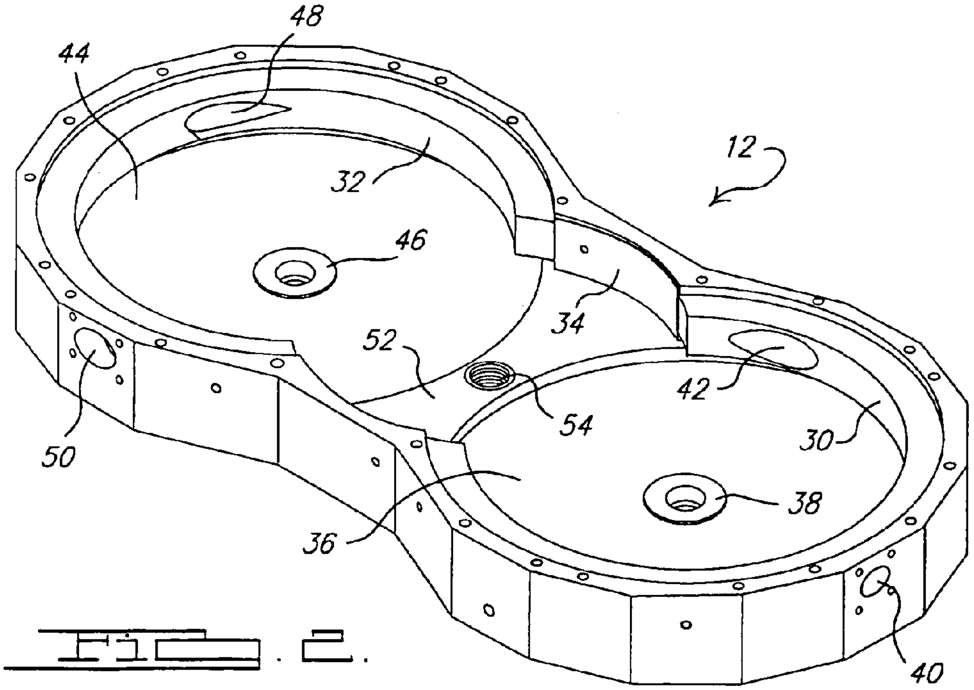
FIG. 2 is an isometric view illustrating the outer housing for the engine shown in FIG. 1.

Referring now to FIGS. 1 and 2, outer housing 12 defines a first cylindrical wall 30, a second cylindrical wall 32 and a third cylindrical wall 34. First cylindrical wall 30 defines a first cavity 36 within which is positioned one of pinwheels 14. A bearing 38 supports pinwheel 14 for rotation with the first cavity 36. A first intake port 40 and a first exhaust port 42 extend through first cylindrical wall 30. Intake port 40 is a part of intake system 22 and exhaust port 42 is part of exhaust system 24. Second cylindrical wall 32 defines a second cavity 44 within which is positioned one of pinwheels 14. A bearing 46 supports pinwheel 14 for rotation with the second cavity 44. A second intake port 48 and a second exhaust port 50 extend through second cylindrical wall 32. Intake port 48 is a part of intake system 22 and exhaust port 50 is part of exhaust system 24. Third cylindrical wall 34 defines a third cavity 52 within which is positioned indexer 16. A bearing 54 supports indexer 16 for rotation with the third cavity 52.

Figure 3:
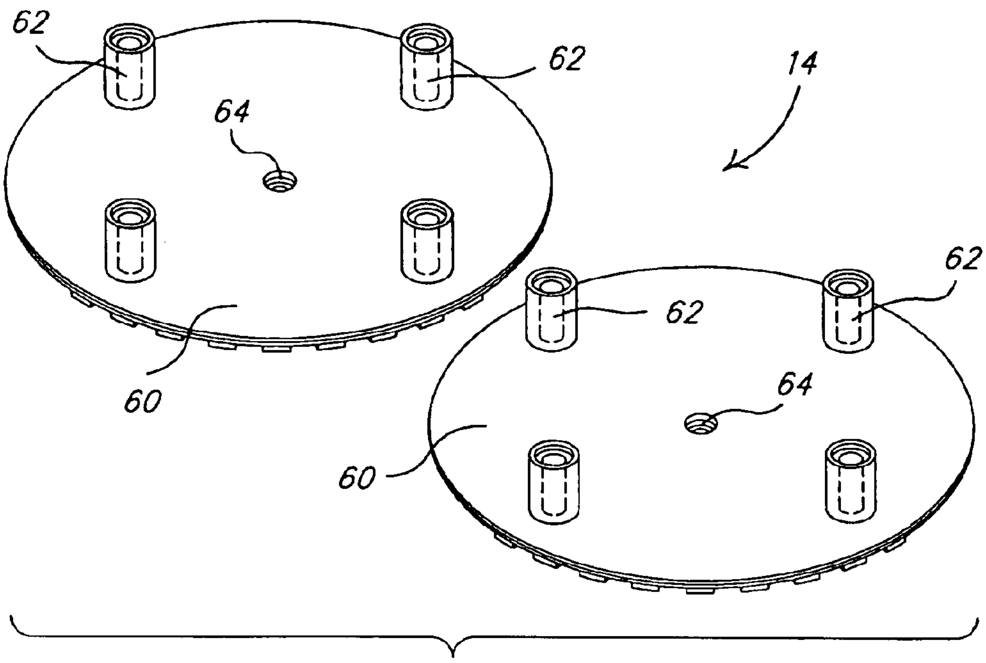
FIG. 3 is an isometric view illustrating two pinwheels for the engine shown in FIG. 1.

Referring now to FIG. 3, the pair of pinwheels 14 each comprise a circular disc 60 and a plurality of piston pins 62 (four illustrated in FIG. 3) extending from circular disc 60. A center hole 64 is used to mount each pinwheel 14 within a respective cavity 36, 44.

Figure 4:
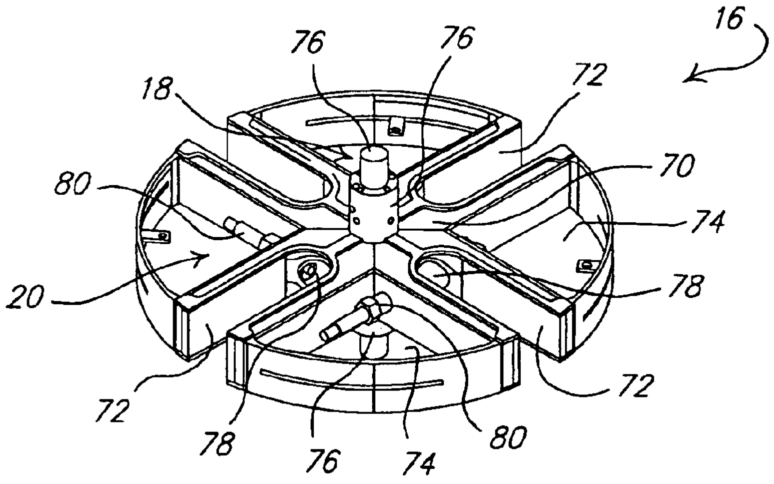
FIG. 4 is an isometric view illustrating the indexer for the engine shown in FIG. 1.

Referring now to FIG. 4, indexer 16 comprises a disc-shaped member 70 defining a plurality of slots 72 (four illustrated in FIG. 4) and a plurality of openings 74 (four illustrated in FIG. 4) disposed between adjacent slots 72. Fuel injection system 18 is attached to indexer 16; and fuel injection system 18 comprises a plurality of injectors 76 (two illustrated in FIG. 4) disposed on opposite sides of indexer 16. Each fuel injector 76 injects fuel into a respective tunnel 78 defined by the center portion of indexer 16. Each tunnel 78 extends between opposing slots 72; and each tunnel 78 is isolated from the other tunnel 78 by being axially displaced from each other in indexer 16. Thus, each injector 76 injects fuel into two opposing slots 72 as described below. Ignition system 20 comprises a plurality of spark plugs 80 (two illustrated in FIG. 4 but a total of four present in the present embodiment) with each spark plug extending into a respective slot 72 to initiate combustion of the fuel supplied by fuel injection system 18. Openings 74 provide access for the assembly of spark plugs 80 into indexer 16.

Figure 5:
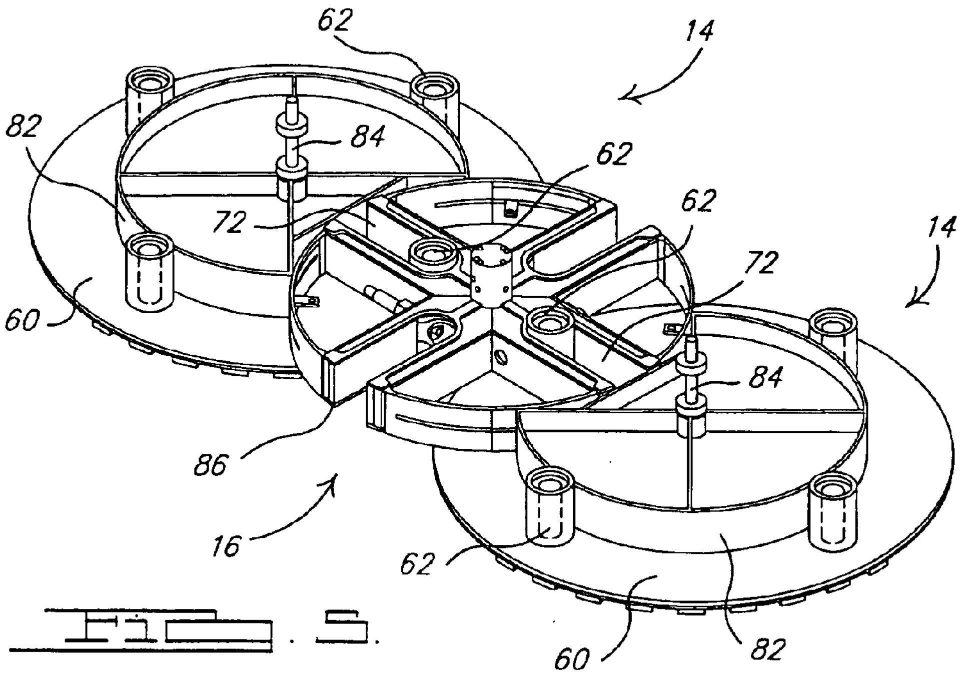
FIG. 5 is an isometric view illustrating the two pinwheels of FIG. 3 engaged with the indexer of FIG. 4.

Referring now to FIG. 5, indexer 16 is shown assembled with the pair of pinwheels 14. Pinwheels 14 are assembled to indexer 16 with each pinwheel 14 having one of the plurality of piston pins 62 disposed within a respective slot 72. As illustrated in FIG. 5, piston pins 62 of pinwheels 14 are disposed in opposing slots 72 at a position which would equate with top dead center (TDC) of a typical piston internal combustion engine. A sealing member 82 is assembled to each pinwheel 14. Sealing member 82 sealingly engages the outer surface of indexer 16 to isolate each slot 72 when it is located between the sealing surfaces of sealing member 82. An axle shaft 84 extends through each sealing member 82 to rotatably support each sealing member 82. Sealing member 82 is a stationary member which does not rotate with pinwheels 14. A seal 86 is disposed around each slot 72 on both sides of indexer 16. When indexer 16 is assembled with the pair of pinwheels 14, seals 86 sealingly engage circular disc 60 of each pinwheel 14 to isolate each slot 72.

Figure 6:
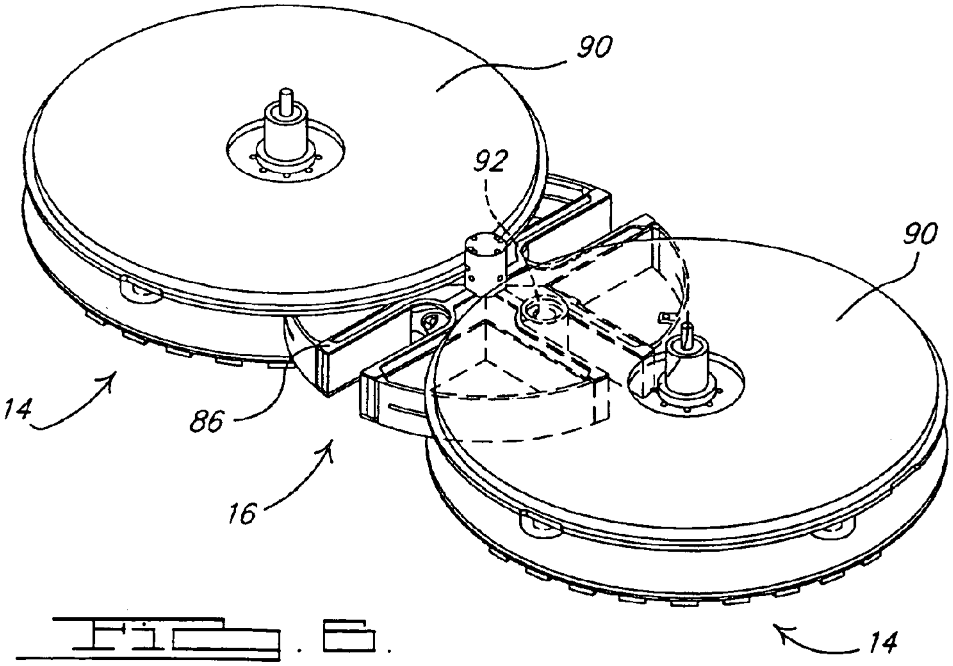
FIG. 6 is an isometric view illustrating the two pinwheels and indexer of FIG. 5 assembled with trap plates.

Referring now to FIG. 6, indexer 16 and the pair of pinwheels 14 are illustrated assembled with a pair of trap plates 90. Trap plates 90 close slots 72 when they are positioned under trap plates 90 to define a compression chamber 92. Seals 86 sealingly engage each trap plate 90 to isolate a respective compression chamber 92 defined by slot 72, circular disc 60 of pinwheel 14 and trap plate 90.

Figure 7:
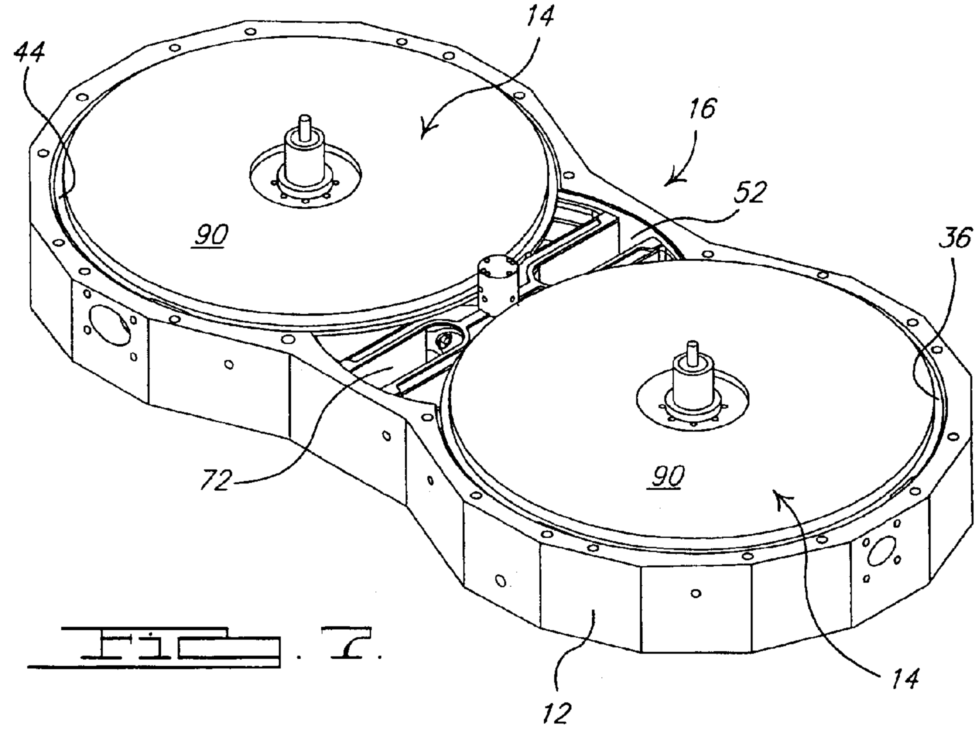
FIG. 7 is an isometric view illustrating the two pinwheels, indexer and trap plates of FIG. 6 assembled into the outer housing of FIG. 2.

Referring to FIG. 7, the pair of pinwheels 14, indexer 16 and trap plates 90 are illustrated assembled into outer housing 12. One pinwheel 14 and one trap plate 90 are disposed within first cavity 36, the second pinwheel 14 and the second trap plate 90 are disposed within second cavity 44, and indexer 16 is disposed within third cavity 52. Each pinwheel 14 has one piston pin 62 disposed within a respective slot 72 of indexer 16 as shown in FIG. 5. Once assembled as illustrated in FIG. 7, cover 26 is assembled to outer housing 12 to complete engine 10 as shown in FIG. 1.

The rotation of indexer 16 and pinwheels 14 causes opposing slots 72 of indexer 16 to receive an initial charge of air from intake ports 40 and 48. This equates to an intake stroke. The initial charge of air can be at atmospheric pressure or it can be pressurized by a turbo-charger, a blower or by other means known in the art. Continued rotation of indexer 16 and pinwheels 14 will cause a piston pin 62 from each pinwheel 14 to enter one of the opposing slots 72. As each piston pin 62 enters its respective slot 72 and each pin 62 sealingly engages the wall of its respective slot 72, the outer surface of indexer 16 passes the sealing portion of each sealing member 82 and each opposing slot 72 becomes a sealed compression chamber 92.

Figure 14:
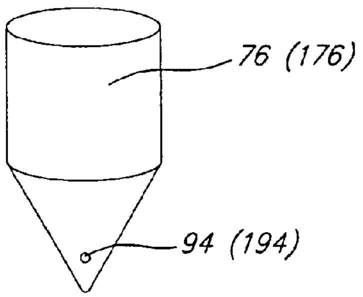
FIG. 14 is an isometric view of the rotatable fuel injector of the present invention.
Figure 17:
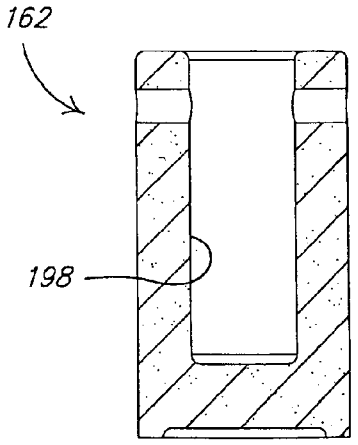
FIG. 17 is a cross-sectional view of one of the piston pins illustrated in FIG. 15.

Continued rotation of indexer 16 and pinwheels 14 will cause each piston pin 62 to traverse further and further into its respective slot 72 until the position shown in FIG. 5 is reached. This causes compression of the initial air charge within sealed compression chamber 92 and equates to a compression stroke. At a pre-selected time during this compression stroke of piston pin 62, one fuel injector 76 of fuel injection system 18 injects fuel into its respective tunnel 78, which injects fuel into each of the opposing slots 72 or each of the opposing compression chambers 92. Fuel injectors 76 include two jet orifices 94 (FIG. 14). At low load, one orifice is pointed toward the spark plug 80 in one slot 72 and the other orifice is pointed to the spark plug 80 in the opposing slot 72 for stratified charge combustion. At higher loads, injectors 76 can be rotated by a small electric motor (not shown) such that a fan-like spray pattern can be mapped for (medium to full load) whole compression chamber 92 filling and combustion. At a pre-selected time just prior to or at a pre-selected time just after each piston pin 62 reaches the position shown in FIG. 5, which is equivalent to top dead center in the prior art engines, the two spark plugs 80 of ignition system 20, which are located within the opposing slots 72 or the opposing compression chambers 92 are activated to ignite the fuel-air mixture that is within each compression chamber 92 and its associated tunnel 78. The ignition and subsequent burning of the fuel-air mixture within each compression chamber 92 causes continued rotation of indexer 16 and pinwheels 14. This is equivalent to a power stroke. The continued rotation of indexer 16 and pinwheels 14 will cause each piston pin 62 to traverse further and further out of its respective slot 72 and piston pins 62 will exit their respective slots 72; and these slots 72 will align with exhaust ports 42 and 50 of exhaust system 24 to exhaust the products of combustion created by the ignition and burning of the fuel-air mixture. This is equivalent to an exhaust stroke. Continued rotation of indexer 16 and pinwheels 14 will cause the opposing slots 72 to receive an additional air charge and the cycle begins again.

Engine 10, as illustrated, has four piston pins 62 on each pinwheel 14 and four slots 72 in indexer 16. Thus, a single revolution of each pinwheel 14 results in all four piston pins 62 of each pinwheel 14 completing all four strokes of the power cycle. Thus, engine 10 delivers four power strokes per pinwheel 14 per revolution as compared to one power stroke per revolution for a prior art 4-cylinder, 4-stroke reciprocating engine. Therefore, engine 10 having a displacement of 106 cc can deliver the same power at the same speed as an 848 cc 4-cylinder, 4-stroke reciprocating engine. Alternately, engine 10 can deliver the same power as the prior art 4-cylinder, 4-stroke reciprocating engine, but at ⅛ of the engine speed. Also, because of the multiple power pulses per revolution and the inherent balance of engine 10, a broad speed range between an ultra low idle (125 rpm) and a high top speed (8000 rpm) should be attainable.

The following presents various advantages of the engine of the present invention over the prior art 4-cylinder, 4-stroke reciprocating engine.

Surface to Volume (s/v) Ratio

To maximize the amount of energy converted from fuel to thrust, the least amount of heat should be allowed to escape through the combustion chamber walls. If heat escape can be minimized, then more heat will stay in the gas and the peak pressure will be greater. The ratio of surface area to the volume in the chamber at TDC is a measure of thermodynamic efficiency. The larger the surface area for any given volume, the larger the heat losses. Table 1 shows a comparative analysis of the engine of the present invention compared with an identically sized reciprocating engine with the same compression ratio (cr). In this comparison, the reciprocating model was calculated assuming a pancake-style cylinder head with no squish/quench zones. The engine of the present invention has a large squish zone and its surface area is included in the calculation.

TABLE 1

| | Present Invention | Reciprocating Engine | Units |
|---|---|---|---|
| Vol @ TDC | 23 | 23 | cc |
| cr | 9.2 | 9.2 | N/A |
| Surface Area | 6072 | 6575 | $mm^2$ |
| s/v ratio | 2.63 | 2.85 | $cm^2$/cc |
| DELTA | 8.3% | | |

A better s/v ratio will reduce HydroCarbon (HC) emissions. HC is released to the exhaust when the flame cools and stops burning as it reaches the chamber walls. The lesser the surface area, the less HC will be released.

The engine of the present invention delivers better s/v due to the fact that there are, effectively, two chambers joined together back-to-back. Because there is no back to the tunnel, its surface area is reduced and its volume increased. Also, the overall trumpet shape of the chamber is closer to an ideal s/v ratio (a sphere) than the pancake chamber used in many reciprocating engines. Thus, an 8.3% improvement in s/v ratio is likely to translate into increased peak pressure and decreased HC release.

Misfire

Pre-ignition. Pre-ignition occurs when a hot spot ignites the mixture ahead of the timed spark. This advances combustion so that too great a pressure build-up occurs before TDC. This creates excessive negative work. Pre-ignition can be caused by some overheated protruding part in the chamber. The spark plugs, sharp corners, direct injectors or carbon deposits can be a cause of hot spots in both the engine of the present invention and reciprocating engines, but only reciprocating engines can get hot spots from valves and gaskets, as the engine of the present invention has neither.

Detonation. When the end mixture advances in front of the flame front in a non-turbulent manner, it gets backed into a corner where the pressure builds up to such an extent that it explodes spontaneously. This is detonation. Abnormally high pressure waves ring through the chamber giving a characteristic pinging or knocking sound and can damage the engine. Detonation scours the protective boundary layer and oil film causing further deterioration. A slow-moving, non-turbulent flame front and lean mixtures is the leading cause of detonation. The engine of the present invention has four power strokes per revolution and, therefore, has the potential to idle below 125 rpm. At such a low speed, detonation is more likely. Boosted compression ratio also increases the likelihood of detonation but, fortunately, GDI, stratified charge and excess EGR decreases detonation tendency. Thus, pre-ignition is less likely in the engine of the present invention, as the chamber has fewer sharp edges than the reciprocating engine where hot-spotting can occur. Detonation would be a serious problem at ultra low speeds if it weren't for the use of GDI and stratified charge technology.

Twin Spark Plugs

Duel ignition reduces the flame path and allows for less advanced ignition timing. In comparing reciprocating engines with either single or twin spark plugs, duel ignition can complete the burn time 6' (of crank angle) sooner. This generates (i) a higher peak pressure (more torque), (ii) less negative (compressive) work with less advance, (iii) less cyclic dispersion, (iv) improved fuel economy and (v) improved response; all of these, particularly at mid to low loads. The engine of the present invention uses duel ignition and should mirror the twin plug reciprocating engine's advantages. Additionally, the engine of the present invention has GDI but with two orifices on each injector tip, each of which is aimed at a spark plug. Thus, two separate stratified charges are generated at low load.

Twin plugs are necessary in the engine of the present invention to generate performance advantages at low and mid speed ranges and to facilitate full advantage of the back-to-back, tunneled combustion chamber.

Boosted Compression, Extended Expansion (Atkinson Cycle), Work and Power

In Table 2 below, we see the data for the same identical engine sizes and compression ratio. The reciprocating engine begins compression at bottom dead center (BDC). Here, we assume the pressure is at atmospheric, 1 bar. If this engine is motored (no combustion), then peak pressure at TDC is 22.4 bar (adiabatic compression). After TDC (aTDC), the pressure begins dropping (13.6 bar) as the piston begins its expansion stroke. At BDC, expansion ends with pressure returning to atmospheric (reversible adiabatic), 1 bar. When a theoretical 60 bar is added (pressure generated from fuel combustion), then pressure peaks at 73.6 bar aTDC. This pressure thrusts the piston to BDC. However, at BDC, there is still 5.4 bar of pressure left over that will be wasted when the exhaust valve opens.

The engine of the present invention benefits from starting its compression stroke before BDC (bBDC). Thus, at BDC, the pressure has risen to 1.3 bar, getting a 0.3 bar head start (+30%), or boost, on the reciprocating engine. By the time the piston pin has reached TDC (in the motored case), the pressure peaks at 28.6 bar compared to 22.4 bar for the reciprocating engine (adiabatic compression). At BDC, the pressure returns to 1.3 bar. But, because there is addition expansion capability, it can further expand to 0.7 bar (a partial vacuum). When 60 bar is then added (pressure generated from fuel combustion), pressure peaks at 77.3 bar aTDC. This pressure thrusts the piston pin through BDC (where it is at 5.7 bar) and continues thrusting the pin onward until the exhaust port is exposed (aBDC). Here the pressure is reduced to 3.0 bar, which is then wasted down the exhaust system. This extended expansion is known as the "Atkinson cycle."

TABLE 2

| | Pressure (bar) | | | |
|---|---|---|---|---|
| | Present Invention | | Reciprocating Engine | |
| | motored | combusted 60 bar fuel | motored | combusted 60 bar fuel |
| bBDC | 1.0 | 1.0 | — | — |
| BDC | 1.3 | 1.3 | 1.0 | 1.0 |
| TDC | 28.6 | 28.6 | 22.4 | 22.4 |
| aTDC | 17.3 | 77.3 | 13.6 | 73.6 |
| BDC | 1.3 | 5.7 | 1.0 | 5.4 |
| aBDC | 0.7 | 3.0 | — | — |

Figure 8:
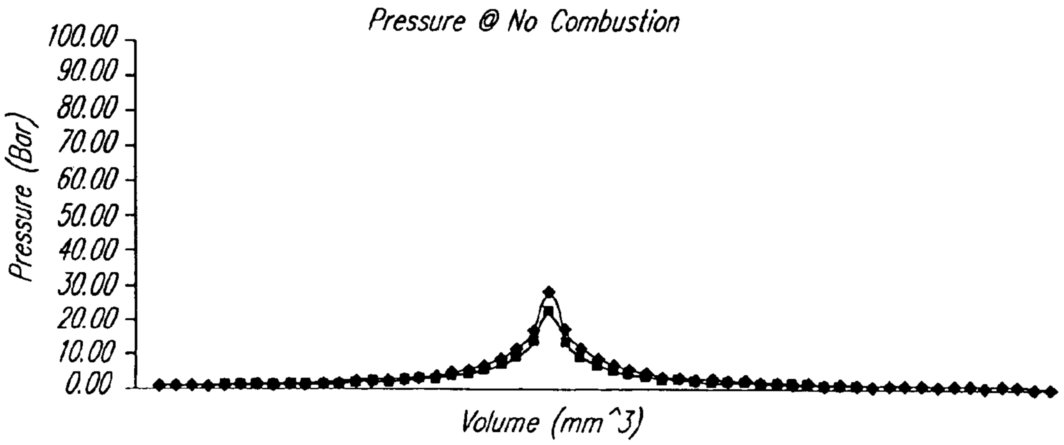
FIG. 8 is a comparison of motored pressure between the engine of the present invention and a reciprocating engine.
Figure 9:
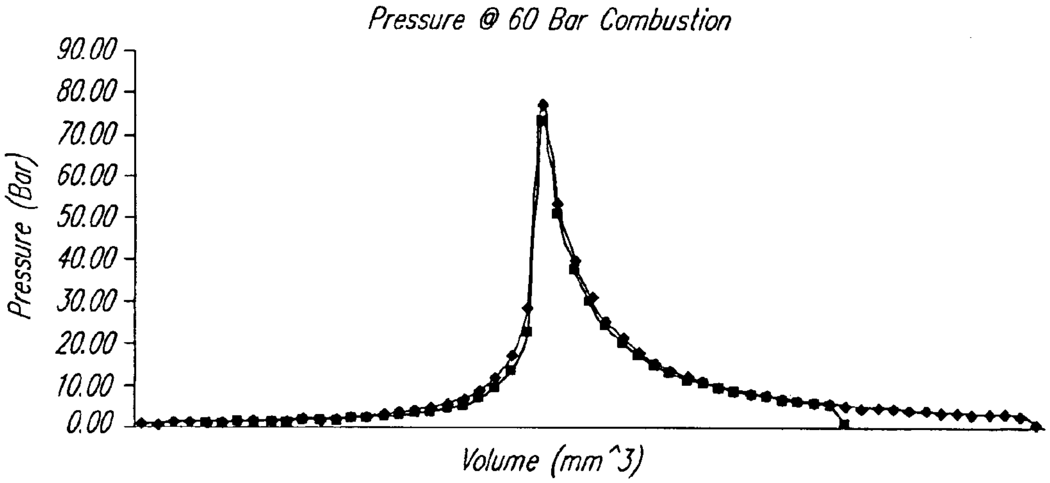
FIG. 9 is a comparison of combusted pressure between the engine of the present invention and a reciprocating engine.

FIG. 8 shows the boosted induction with no combustion and this is translated into higher peak pressure (higher torque) in FIG. 9 which includes the 60 bar combustion. The extended expansion can clearly be seen on the right-hand side of the slope.

Figure 10:
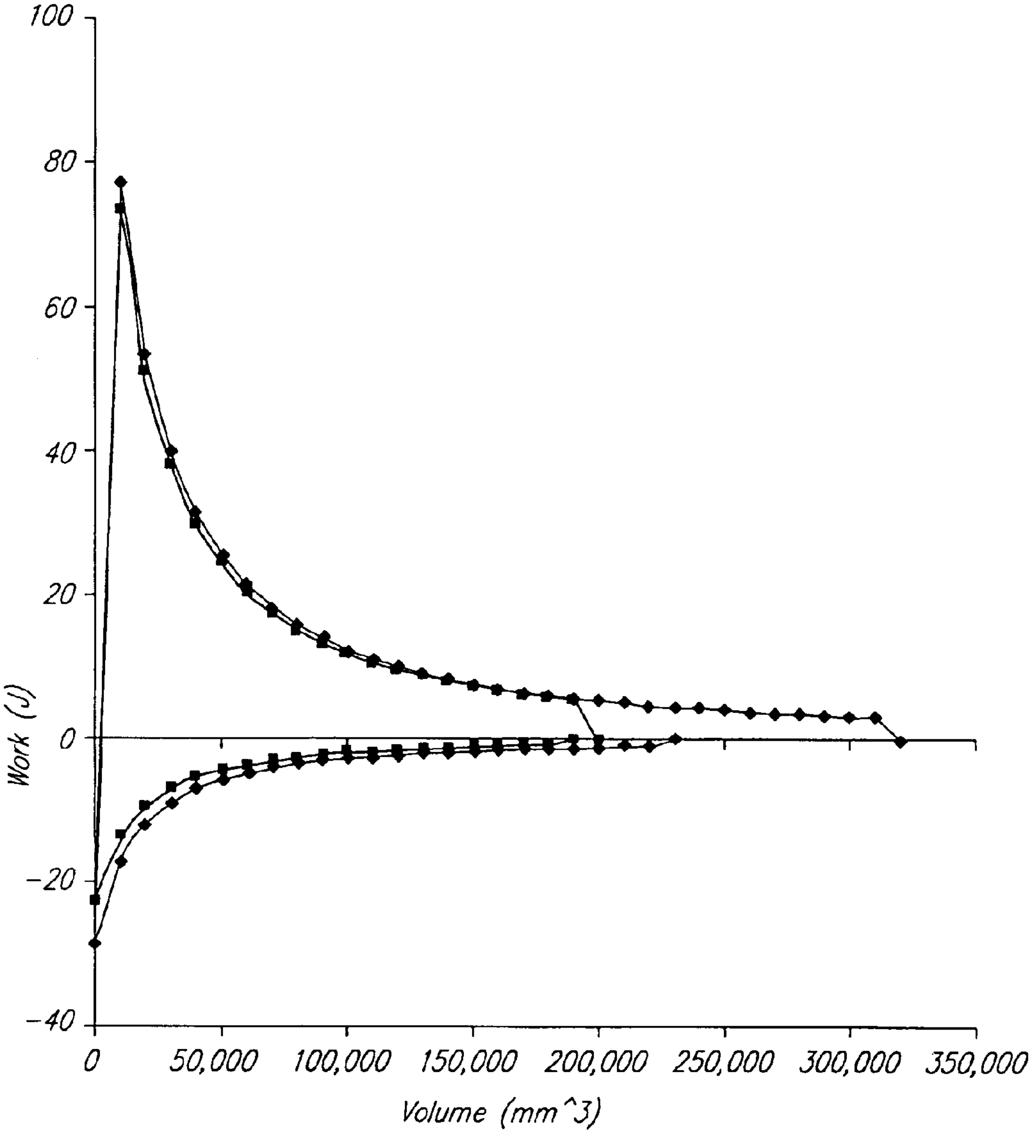
FIG. 10 is a comparison of work between the engine of the present invention and a reciprocating engine.

In FIG. 10, the work generated by this cycle has been calculated.

Clearly, there is some additional negative work for the engine of the present invention in compressing the extra inducted air but there is significantly more positive work output due to the Atkinson expansion. Table 3 shows the Work (J) comparison.

TABLE 3

| | Present Invention | | | Reciprocating Engine | | | |
|---|---|---|---|---|---|---|---|
| | Work (J) | | | | | | |
| | 311 | | | 274 | | | |
| | Power | | | | | | Delta |
| RPM | Kw/L | kW/slot | ×8 | Kw/L | kW/cyl | ×1 | 14% |
| 1000 | 24.4 | 5.2 | 41.5 | 21.4 | 4.6 | 4.6 | |
| 2000 | 48.7 | 10.4 | 83.0 | 42.8 | 9.1 | 9.1 | |
| 3000 | 73.1 | 15.6 | 124.6 | 64.2 | 13.7 | 13.7 | |
| 4000 | 97.4 | 20.8 | 166.1 | 85.6 | 18.2 | 18.2 | |
| 5000 | 121.8 | 26.0 | 207.6 | 107.0 | 22.8 | 22.8 | |
| 6000 | 146.1 | 31.1 | 249.1 | 128.4 | 27.4 | 27.4 | |
| 7000 | 170.5 | 36.3 | 290.6 | 149.8 | 31.9 | 31.9 | |
| 8000 | 194.9 | 41.5 | 332.2 | 171.2 | 36.5 | 36.5 | |

Thus, as shown in Table 3, the engine of the present invention outperforms the reciprocating engine by 14% when comparing an equivalent single slot on the engine of the present invention versus a single cylinder on the reciprocating engine. This net 14% gain is the residual work due to the Atkinson expansion less the negative work for the additional (boosted) compression. Thus, all else being equal, the engine of the present invention is 14% more powerful or delivers 14% less specific fuel consumption (sfc) than the reciprocating engine. Of particular note is the capability of the engine of the present invention to generate power. Unlike the 4-cylinder reciprocating engine which has one power stroke per revolution, the engine of the present invention has eight. Thus, the power per revolution is 9.12 times (8×1.14) as great as the equivalent reciprocating engine. With this range of power, it may be possible to negate the necessity for gearboxes in some applications. Note, it would still require eight times as much fuel to generate eight times the power, but the net 14% "Atkinson dividend" is still a direct sfc or power advantage. These comparisons indicate the theoretical work and power output; they do not take into consideration other losses, such as friction or pressure leakage.

We have identified the additional compression boost that is available with the engine of the present invention without the need for a super-charger or turbo-charger. However, the analysis made thus far assumed an identical energy input (60 bar) from fuel. With the additional 0.3 bar of boost (+30%) over atmospheric achieved in Table 2, it is possible to add an additional 30% fuel and still achieve a stoichiometric mixture. Table 4 shows the impact of this additional energy input.

TABLE 4

| | Pressure (bar) | | | |
|---|---|---|---|---|
| | Present Invention | | Reciprocating Engine | |
| | motored | combusted 60.3 bar fuel | motored | combusted 60.3 bar fuel |
| bBDC | 1.0 | 1.0 | 1.0 | 1.0 |
| BDC | 1.3 | 1.3 | 1.0 | 1.0 |
| TDC | 28.6 | 28.6 | 22.4 | 22.4 |
| aTDC | 17.3 | 93.6 | 13.6 | 73.6 |
| BDC | 1.3 | 6.9 | 1.0 | 5.4 |
| aBDC | 3.0 | 3.7 | 1.0 | 1.0 |

Figure 11:
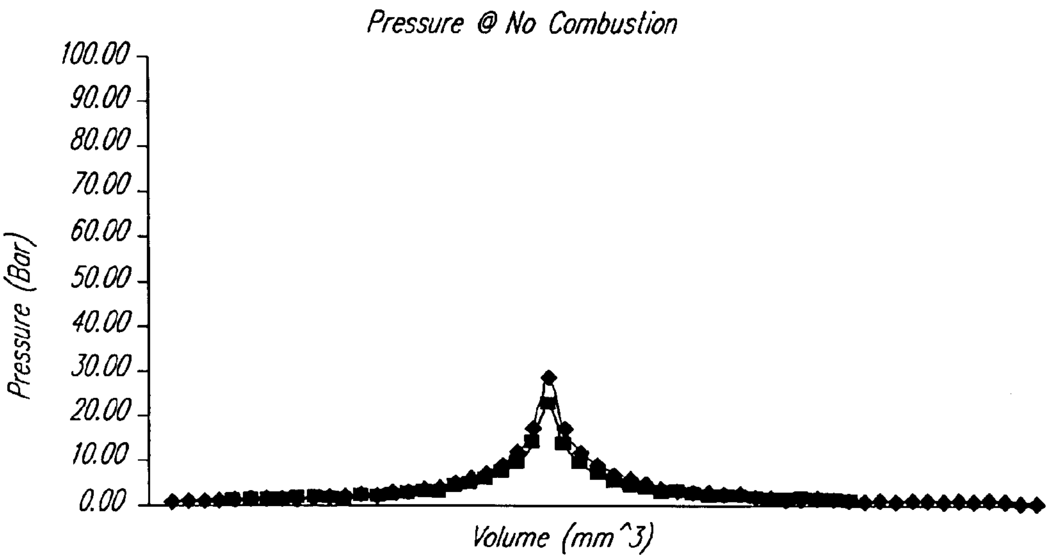
FIG. 11 is a comparison of motored pressure between the engine of the present invention and a reciprocating engine, with an additional 30% of fuel and air for the engine of the present invention.
Figure 12:
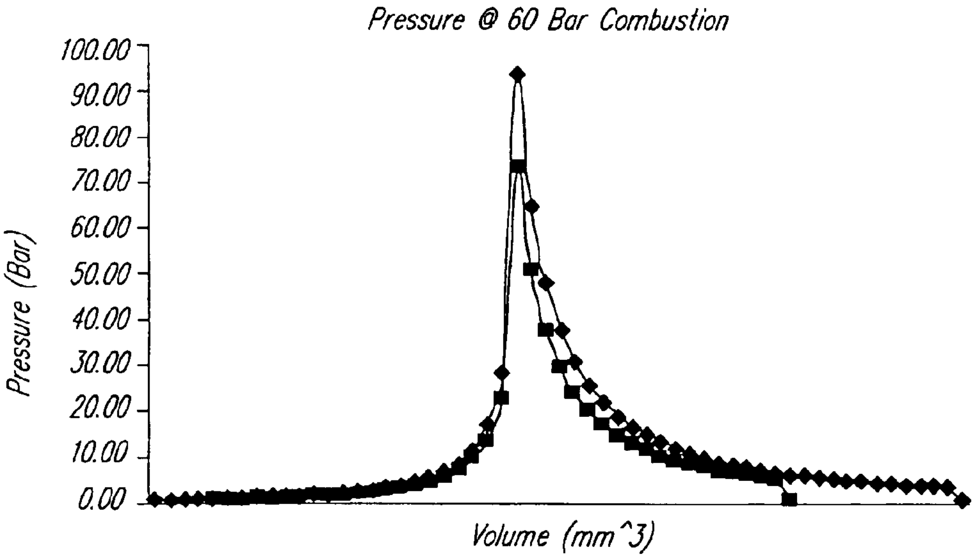
FIG. 12 is a comparison of combusted pressure between the engine of the present invention and a reciprocating engine, with an additional 30% of fuel and air for the engine of the present invention.
Figure 13:
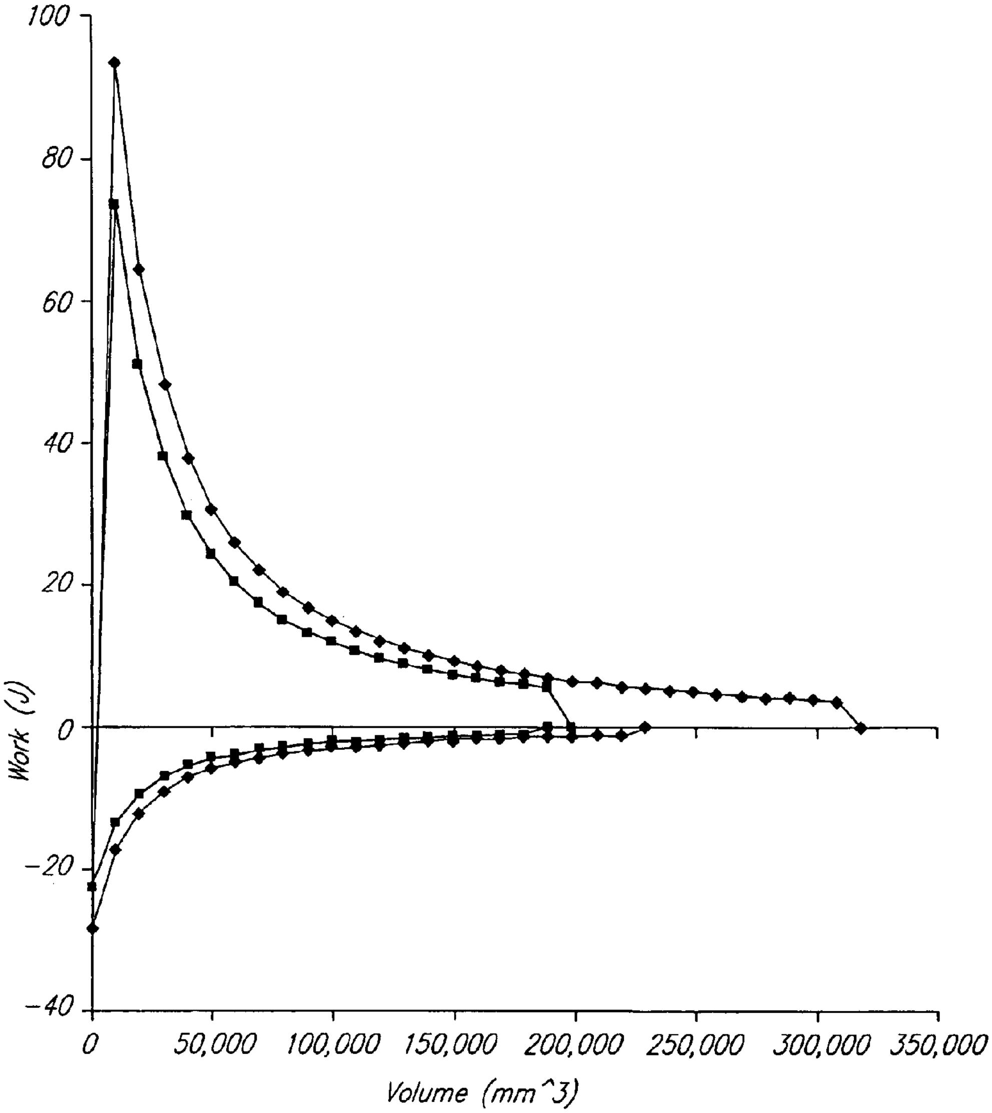
FIG. 13 is a comparison of work between the engine of the present invention and a reciprocating engine, with an additional 30% of fuel and air for the engine of the present invention.

Table 4 is similar to Table 2, FIGS. 11–13 are similar to FIGS. 8–10, respectively, and Table 5 is similar to Table 3 except for relating to the addition of 30% more fuel because of the 0.3 bar in boost.

TABLE 5

| | Present Invention | | | Reciprocating Engine | | | |
|---|---|---|---|---|---|---|---|
| | Work (J) | | | | | | |
| | 402 | | | 274 | | | |
| | Power | | | | | | Delta |
| RPM | Kw/L | kW/slot | ×8 | Kw/L | kW/cyl | ×1 | 47% |
| 1000 | 31.4 | 6.7 | 53.6 | 21.4 | 4.6 | 4.6 | |
| 2000 | 62.9 | 13.4 | 107.2 | 42.8 | 9.1 | 9.1 | |
| 3000 | 94.3 | 20.1 | 160.8 | 64.2 | 13.7 | 13.7 | |
| 4000 | 125.8 | 26.8 | 214.4 | 85.6 | 18.2 | 18.2 | |
| 5000 | 157.2 | 33.5 | 268.0 | 107.0 | 22.8 | 22.8 | |
| 6000 | 188.6 | 40.2 | 321.6 | 128.4 | 27.4 | 27.4 | |
| 7000 | 220.1 | 46.9 | 375.2 | 149.8 | 31.9 | 31.9 | |
| 8000 | 251.5 | 53.6 | 428.8 | 171.2 | 36.5 | 36.5 | |
| 9000 | 283.0 | 60.3 | 482.4 | 192.6 | 41.0 | 41.0 | |
| 10000 | 314.4 | 67.0 | 536.0 | 214.0 | 45.6 | 45.6 | |

Thus, the engine of the present invention has potential to generate 47% more work when boosted with commensurate fuel input than an equivalent reciprocating engine. Power per revolution is 11.7 times (8×1.47) as great as the equivalent reciprocating engine. Note: these comparisons indicate the theoretical work and power output; they do not take into consideration other losses, such as friction or pressure leakage.

Friction and Pumping Losses

From Blackmore and Thomas (1977), an analysis of a 1.5 liter reciprocating engine operating at 4000 rpm generated losses as follows:

| | kW |
|---|---|
| Pumping through ports and valves | 3.80 |
| Valve gear friction | 0.70 |
| Piston ring friction | 2.80 |
| Piston and con rod friction | 2.80 |
| Oil pumping | 0.20 |
| Crankshaft friction | 1.00 |
| Total power loss | 11.30 |

Using this analysis as a benchmark, we can estimate the friction and pumping losses associated with the engine of the present invention (assumptions in parenthesis):

| | kW |
|---|---|
| Pumping through ports and valves<br>(75% reduction - no valves) | 0.95 |
| Valve gear friction<br>(100% reduction - no valves) | 0.00 |
| Piston ring friction<br>(assume same friction with piston pin) | 2.80 |
| Piston and con rod friction<br>(piston pin friction as above - no con rods) | 0.00 |
| Oil pumping<br>(assume same) | 0.20 |
| Crankshaft friction<br>(5 main plain bearings replaced with 12 rolling element bearings. Crank weight eliminated. Assume 25% reduction) | 0.75 |
| Total power loss | 4.70 |

Thus, the engine of the present invention delivers a net power gain of 6.6 kW at 4000 rpm. Friction and pumping losses are reduced by an estimated 58%.

Stratified Modes—GDI and ADI

In most SI engines, a throttle is used to control the amount of air entering the cylinder. Fuel is injected either near the throttle body (single-point fuel injection —SPFI) or near each inlet port (multi-point fuel injection—MPFI). The timed pulse of the injection event is controlled by the ECU to deliver a (close to) stoichiometric mixture to the cylinder. At low load, less fuel and less air (more throttle) enter the cylinder. At high load, the throttle is opened wide (WOT) and a longer pulse of fuel is injected into the port. In either case, a homogeneous mixture enters the cylinder.

In a gas direct injection (GDI) engine, the injector sprays fuel directly into the cylinder. At low load, it is desirable to spray the fuel into the vicinity of the spark plug, creating a moving cloud of (ideally) stoichiometric mixture that will be ignited by the spark plug at the right instant. Outside of this cloud, the gas (air and/or exhaust gas residue—EGR) has little or no fuel in it. Therefore, only a small combustion event occurs, providing reduced thrust on the piston. Low load combustion can thus be achieved without the need to throttle the incoming air. This significantly reduces pumping losses. Additionally, during this stratified mode, it is impossible for detonation to occur, as there is no surrounding fuel/air mixture that can spontaneously ignite. Thus, a higher compression ratio can be tolerated. Typically, GDI engines deliver 10–15% specific fuel consumption (sfc) performance improvements of PFI engines.

At higher loads, it is desirable to spray the fuel centrally into the cylinder in order to create a more homogeneous mixture throughout. However, until now, a compromise has been needed to position the injector to achieve both high load homogeneous cylinder filling and stratified cloud formation at the spark plug. This compromise has normally been met by utilizing the cylinder wall or piston crown as a mechanism to deflect the spray cloud to the spark plug (when near TDC). The spray impingement on the wall or piston, unfortunately, causes poor emissions and/or burning performance and/or causes the formation of deposits.

In the engine of the present invention, the injector has two orifices, each pointing to a diametrically opposed spark plug at each end of the combustion tunnel. The injector is held stationary while the indexer moves about it on the same axis. However, the injector can be rotated back and forth about some angle such that, in low rpm, stratified mode, the injection event will occur such that the two spray clouds will reach the spark plugs at the optimum time. In higher speed, homogeneous mode, the injector can be rotated (under ECU command) to ensure that the spray is directed more down the center of the cylinder. In fact, at higher speeds and longer injection durations, the spray pattern becomes fanned out, more completely creating homogeneity. This directable injection system is termed active direction injection (ADI).

The relatively long distance for the sprays to reach the spark plugs in the combustion tunnel of the engine of the present invention provides better mixture preparation and combustion than short-throw or wall-guided configurations.

Thus, GDI delivers 10–15% reduced sfc. In the engine of the present invention, the proximity to and directability of the ADI system is predicted to provide better stratified, transitional and homogeneous mode performance with reduced HC emissions.

Balance and Vibration

In reciprocating engines, there exist primary and secondary motions of the piston which cause vibration and fatigue, as well as couple moments that create torsional vibration in the crankshaft. These forces can be balanced by crank geometry, cylinder arrangement (e.g, in-line 6, V8, etc.) and by using countermeasures such as dampers and counter-rotating masses. However, all these countermeasures add weight and complexity.

In the engine of the present invention, the pinwheels are in perfect balance and only the indexer undergoes sinusoidal motion about its axis. There are no couple moments. By using two pinwheels and tunnel chambers on the indexer, the combustion forces on the indexer shaft are also completely balanced.

The sinusoidal forces causing the angular velocity on the indexer to speed up and slow down will need to be absorbed within the indexer itself. Thus, reducing its weight (and, thus, inertia) is critical in minimizing these forces.

In a reciprocating engine, the continuous pulsing (once per revolution in a 4-stroke, 4-cylinder) caused by the combustion needs to be smoothed out by a heavy flywheel. In the engine of the present invention, the pulsing occurs every ¼ of a revolution. So at a comparable speed, the engine of the present invention requires less pulse smoothing. In fact, the pinwheels themselves act as flywheels to help provide smooth operation.

Displacement on Demand (DOD)

A current trend to reduce sfc at low idle and cruise conditions is to deactivate the fuel and/or ignition and/or valve actuation of specified cylinders in 6- to 12-cylinder engines. The deactivation is generally rotated about the cylinders so as to maintain thermal and tribological equilibrium. The deactivation also allows a wider throttle opening and, thus, higher efficiency operation in the remaining active cylinders. DOD is not typically conducted in 4- or 6-cylinder engines, as balance is compromised.

In the twin pinwheel of the engine of the present invention, DOD is possible by deactivating the fuel and spark from a tunnel chamber. Although GDI technology in itself has the potential to eliminate the necessity for DOD, the ultra low rpm capability may make DOD attractive for some applications. The two tunnels, labeled, say, X and O may be deactivated in rotation as follows:

| | |
|---|---|
| Infrequent Deactivation: | 14% fuel savings |
| ~~X~~ O X O X O X ~~O~~ X O X O X O ~~X~~ | |
| Frequent Deactivation: | 20% fuel savings |

-continued

| | |
|---|---|
| **X** O X O X ⊖ X O X O **X** O X O X | |
| High Frequency Deactivation: | 33% fuel savings |
| **X** O X ⊖ X O **X** O X ⊖ X O **X** O X | |

Clearly balance is maintained for smooth operation. However, (negative) work is required to compress the inducted air (partially offset by positive work as it expands past TDC), as the engine of the present invention has no valves it can hold open. Thus, DOD can deliver up to 33% sfc savings.

Air Injection and Fast Catalyst Light-off

In order to reduce CO and HC emissions after combustion, additional air can be introduced into the exhaust stream to help extend combustion. About 20% injected air gives a good balance of CO and HC reduction in homogeneous mode operation. In reciprocating engines, an auxiliary air pump system is required.

Inherently, the engine of the present invention has its own integrated, automatic air pumping system, albeit at a fixed volume. When the piston pin enters the slot, the space immediate behind the piston pin contains a slug of fresh air. As the piston pin travels down the slot, this slug of air follows it. After TDC, when the piston pin begins its expansion stroke, it now thrusts this slug of fresh air out into the exhaust stream of the previous pin's exhaust stroke. Thus, each slug of exhaust is chased by a slug of fresh air. Any remaining HCs have added oxygen to continue their burning.

During cold weather starts, an enriched mixture is required. With the integrated air injection of the engine of the present invention, more burning is likely to take place down the exhaust tract, which will assist in getting the catalyst up to operating temperature (fast light-off). Thus, air injection is achieved at no added cost or complexity, resulting in lower CO and HC emissions.

Engine Part Count and Complexity

Clearly, there are fewer fixed and moving parts in the engine of the present invention. Consider also that this compares an 8-slot engine of the present invention with a 4-cylinder reciprocating engine. Examining the principal components in Table 6 below:

TABLE 6

| | Present Invention | Reciprocating Engine |
|---|---|---|
| Pistons | 8 | 4 |
| Con rods | — | 4 |
| Crankshaft | — | 1 |
| Trap plate | 4 | — |
| Indexer | 1 | — |
| Fuel injectors | 2 | 4 (MPFI) |
| Valves | — | 8 (min) |
| Valve springs | — | 8 (min) |
| Camshaft | — | 1 (min) |
| Cam drive gear | — | 1 |
| EGR system | — | 1 |
| Total | 15 | 32 |
| Delta | 46% | |

All else being equal, the engine of the present invention has only 46% of the principal parts of a reciprocating 4-cylinder engine. This translates into higher reliability and lower costs.

Emissions

The over-riding impact on emissions is the ability of the engine of the present invention to significantly reduce sfc. A large engine certified as ULEV still produces more emissions than a smaller ULEV engine.

The extended Atkinson cycle, stratified charge, and DOD at low loads and induction boosting at higher loads are predicted to provide significant sfc savings. This directly translates into lower carbon dioxide ($CO_2$) emissions, the main greenhouse gas.

A smooth combustion chamber and piston pin design (with few crevices) improves thermodynamic efficiency and is predicted to reduce HC and Co.

NOx is reduced by EGR in homogeneous mode, but has the potential to be higher in stratified mode unless post exhaust system strategies are employed.

Residual HC is burnt with air injection, thereby further reducing CO and $CO_2$.

The combination of advantages of the engine of the present invention is predicted to significantly reduce all emissions regardless of fuel type.

Compact Size

The engine of the present invention rivals a boxer engine in terms of compactness. At an overall height of under 150 mm (length 975 mm; width 490 mm), it is flatter per liter of capacity than any IC engine available. Volume envelope, before ancillaries, is typically $60\times10^6$ mm$^3$, which is comparable to an in-line 4-cylinder sized 660 mm×460 mm×200 mm.

Compactness provides a very low center of gravity, aerodynamic and packaging advantages. All of which translate into better vehicle dynamics, performance and safety.

Weight

In the engine of the present invention, the basic 1696 cc weight is 87.5 kg. This compares favorably to VW's air cooled flat four 1600 cc at 91 kg, Honda's liquid cooled 1488 cc at 102 kg and Subaru's liquid cooled boxer 1781 cc at 97 kg (all in aluminum).

Figure 15:
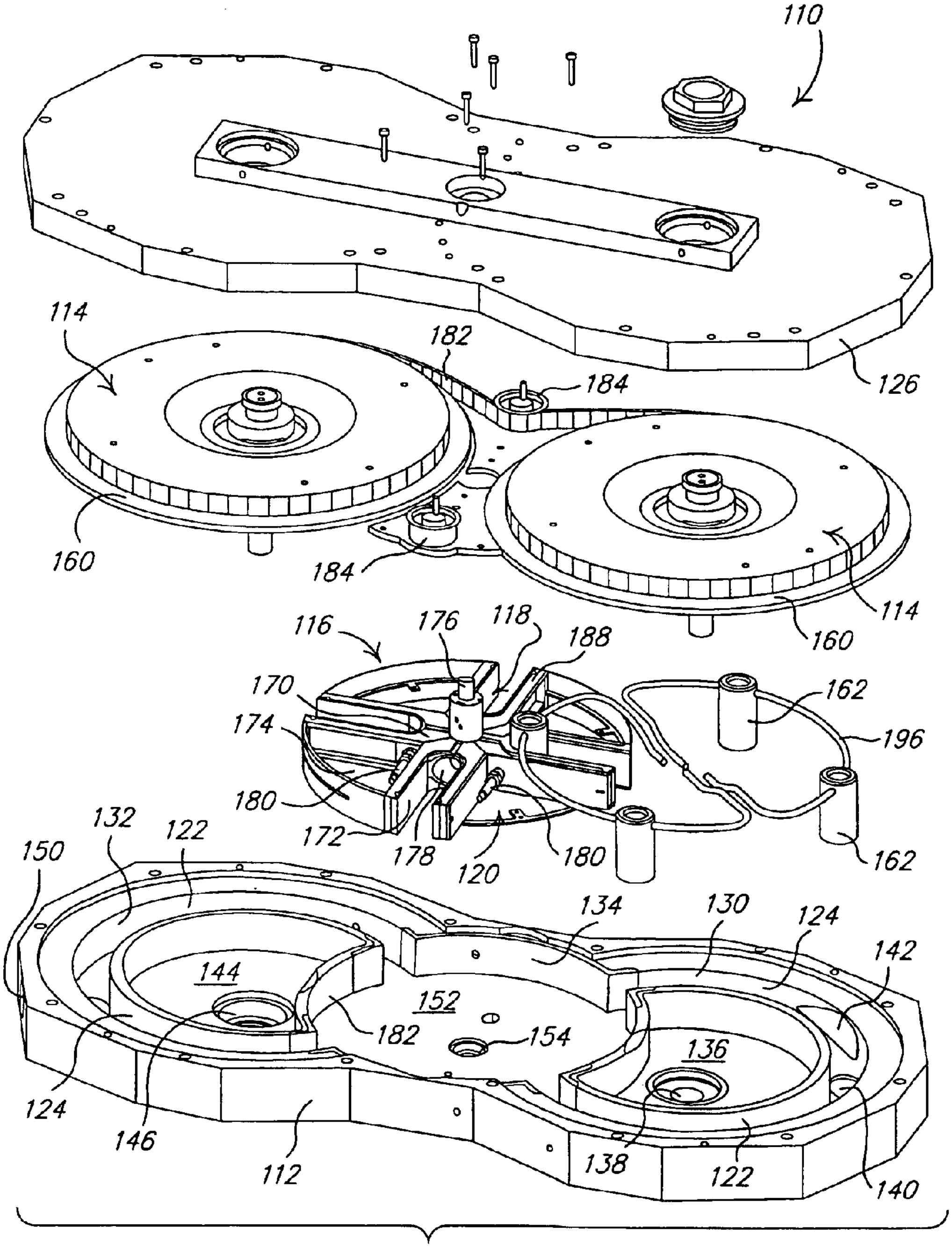
FIG. 15 is an isometric top exploded view illustrating another embodiment of the engine of the present invention.
Figure 16:
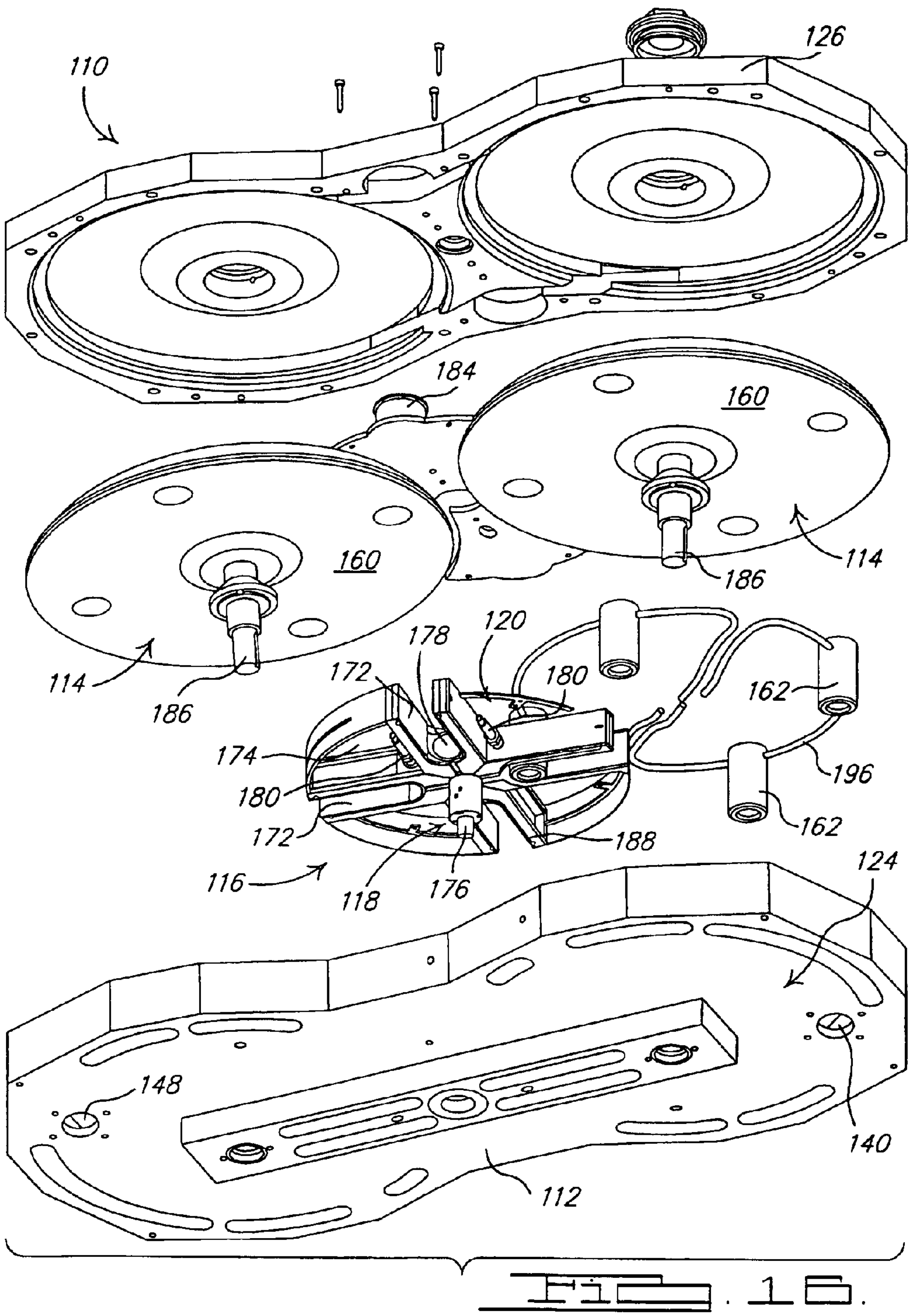
FIG. 16 is an isometric exploded bottom view of the engine illustrated in FIG. 15.
Figure 12:
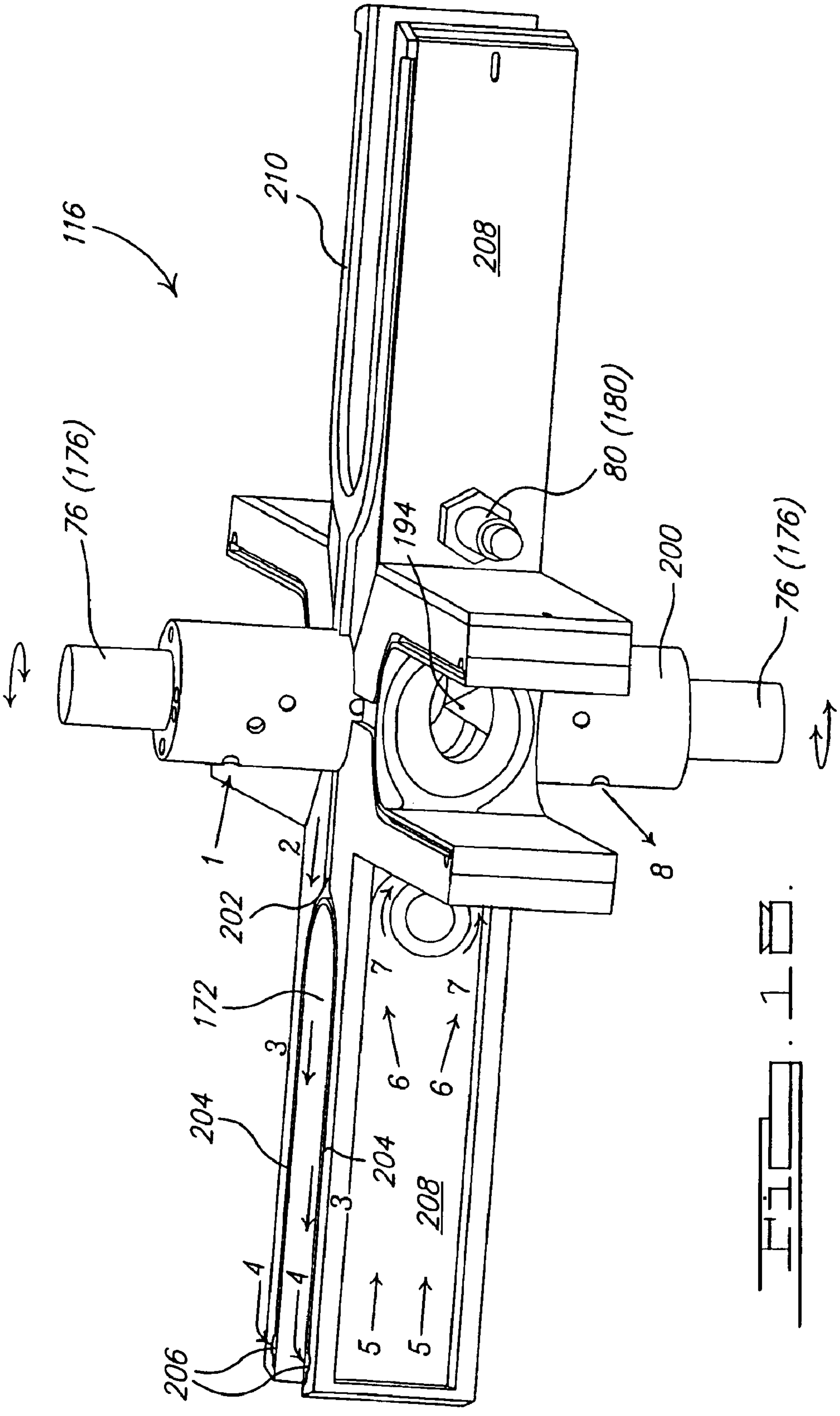

Referring now to FIGS. 15 and 16, an internal combustion engine in accordance with another embodiment of the present invention is illustrated and it is indicated generally with reference numeral 110. Engine 110 comprises an outer housing 112, a pair of pinwheels 114, and indexer or slotted disc 116, a fuel injection system 118, an ignition system 120, an induction passage 122, an exhaust passage 124, and a cover 126.

Outer housing 112 defines a first cylindrical wall 130, a second cylindrical wall 132 and a third cylindrical wall 134. First cylindrical wall 130 defines a first cavity 136 within which is positioned one of pinwheels 114. A bearing 138 supports pinwheel 114 for rotation with the first cavity 136. A first intake port 140 and a first exhaust port 142 extend through the outer housing 112. Second cylindrical wall 132 defines a second cavity 144 within which is positioned one of pinwheels 114. A bearing 146 supports pinwheel 114 for rotation with the second cavity 144. A second intake port 148 and a second exhaust port 150 extend through the outer housing 112. Third cylindrical wall 134 defines a third cavity 152 within which is positioned indexer 116. A bearing 154 supports indexer 116 for rotation with the third cavity 152.

The pair of pinwheels 114 each comprise a circular disc 160 and a plurality of piston pins 162 (four illustrated in FIGS. 14 and 15) extending from circular disc 160.

Indexer 116 comprises a disc-shaped member 170 defining a plurality of slots 172 (four illustrated in FIGS. 15 and 16) and a plurality of openings 174 (four illustrated in FIGS. 15 and 16) disposed between adjacent slots 172. Fuel injection system 118 is attached to indexer 116; and fuel injection system 118 comprises a plurality of injectors 176 (two illustrated in FIGS. 15 and 16) disposed on opposite sides of indexer 116. Each fuel injector 176 injects fuel into a respective tunnel 178 defined by the center portion of indexer 116. Each tunnel 178 extends between opposing slots 172; and each tunnel 178 is isolated from the other tunnel 178 by being axially displaced from each other in indexer 116. Thus, each injector 176 injects fuel into two opposing slots 172 as described below. Ignition system 120 comprises a plurality of spark plugs 180 with each spark plug extending into a respective slot 172 to initiate combustion of the fuel supplied by fuel injection system 118. Openings 174 provide access for the assembly of spark plugs 180 into indexer 116.

Pinwheels 114 are assembled to indexer 116 with each pinwheel 114 having one of the plurality of piston pins 162 disposed within a respective slot 172 (only one set of piston pins shown in FIGS. 15 and 16). Piston pins 162 of pinwheels 114 are disposed in opposing slots 172 at a position which would equate with top dead center (TDC) of a typical piston internal combustion engine. A continuous synchronizing belt 182 has a plurality of teeth which mate with a plurality of teeth formed on each pinwheel 114 to synchronize the rotation of the two pinwheels 114. A pair of belt tensioners 184 located on opposite sides of pinwheels 114 maintain tension on belt 182. An axle shaft 186 extends through outer housing 112 to rotatably support each pinwheel 114. A seal 188 is disposed around each slot 172 on both sides of indexer 116. When indexer 116 is assembled with the pair of pinwheels 114, seals 188 sealingly engage circular disc 160 of each pinwheel 114 and sealingly engage the bottom surface of outer housing 112 to isolate each slot 172.

One pinwheel 114 is disposed within first cavity 136, the second pinwheel 114 is disposed within second cavity 144, and indexer 116 is disposed within third cavity 152. Each pinwheel 114 has one piston pin 162 disposed within a respective slot 172 of indexer 116 as shown in FIGS. 14 and 15. Once assembled, cover 126 is assembled to outer housing 112 to complete engine 110.

The rotation of indexer 116 and pinwheels 114 causes opposing slots 172 of indexer 116 to receive an initial charge of air from intake ports 140 and 148. This equates to an intake stroke. The initial charge of air can be at atmospheric pressure or it can be pressurized by a turbo-charger, a blower or by other means known in the art. Continued rotation of indexer 116 and pinwheels 114 will cause a piston pin 162 from each pinwheel 114 to enter one of the opposing slots 172.

Continued rotation of indexer 116 and pinwheels 114 will cause each piston pin 162 to traverse further and further into its respective slot 172 until it reaches its inner most position within its respective slot 172. This causes compression of the initial air charge within the sealed compression chamber and equates to a compression stroke. At a pre-selected time during this compression stroke of piston pin 162, one fuel injector 176 of fuel injection system 118 injects fuel into its respective tunnel 178, which injects fuel into each of the opposing slots 172 or each of the opposing compression chambers. Fuel injectors 176 include two jet orifices 194 with one jet orifice 194 being directed toward a respective tunnel 178. At low load, one orifice is pointed toward spark plug 180 in one slot 172 and the other orifice 194 is pointed to spark plug 180 in the opposing slot 172 for stratified charge combustion. At higher loads, injectors 176 can be rotated by a small electric motor (not shown) such that a fan-like spray pattern can be mapped for (medium to full load) whole compression chamber filling and combustion. At a pre-selected time just prior to or at a pre-selected time just after each piston pin 162 reaches its inner most position, which is equivalent to top dead center in the prior art engines, the two spark plugs 180 of ignition system 120, which are located within the opposing slots 172 or the opposing compression chambers are activated to ignite the fuel-air mixture that is within each opposing slot 172 or the compression chamber and its associated tunnel 178. The ignition and subsequent burning of the fuel-air mixture within each slot 172 or the compression chamber causes continued rotation of indexer 116 and pinwheels 114. This is equivalent to a power stroke. The continued rotation of indexer 116 and pinwheels 114 will cause each piston pin 162 to traverse further and further out of its respective slot 172 and piston pins 162 will exit their respective slots 172; and these slots 172 will align with exhaust ports 142 and 150 and into exhaust passages 124 to exhaust the products of combustion created by the ignition and burning of the fuel-air mixture. This is equivalent to an exhaust stroke. Continued rotation of indexer 116 and pinwheels 114 will cause the opposing slots 172 to receive an additional air charge and the cycle begins again.

Engine 110, as illustrated, has four piston pins 162 on each pinwheel 114 and four slots 172 in indexer 116. Thus, a single revolution of each pinwheel 114 results in all four piston pins 162 of each pinwheel 114 completing all four strokes of the power cycle. Thus, engine 110, similar to engine 10, delivers four power strokes per pinwheel 114 per revolution as compared to one power stroke per revolution for a prior art 4-cylinder, 4-stroke reciprocating engine. This provides the same features and advantages as described above for engine 10.

FIGS. 15 and 16 illustrate one of a pair of cooling tubes 196 which extend from axle shaft 186 to each of the plurality of piston pins 162. Cooling tubes 196 provide coolant to each of piston pins 162 and this coolant is also a lubricant for piston pins 162. As shown in FIG. 18, each piston pin 162 defines an internal cavity 198 to which coolant/lubricant is directed by cooling tubes 196. Each piston pin 162 is manufactured from a porous metal, preferably phosphor bronze, and the porosity of the material enables the coolant/lubricant to bleed through piston pin 162 to lubricate the interface between piston pin 162 and its respective slot 172.

Referring now to FIG. 18, the oil circulation system for indexer 116 is illustrated. Oil is delivered to an indexer core 200 of indexer 116 as illustrated by Arrow 1 in FIG. 18. The oil then leaves indexer core 200 and travels through a slot 202 that extends across member 170 as illustrated by Arrow 2 in FIG. 18. The flow of oil from slot 202 is divided into two grooves 204 that are disposed on opposite sides of slot 172 as shown by Arrow 3 in FIG. 18. The oil flows through slots 204 and it is directed through a passageway 206 extending through indexer 116 as shown by Arrow 4 in FIG. 18. Passageway 206 opens into a cavity 208 that is located behind each slot 172 and the oils flows through cavity 208 as illustrated by Arrows 5 and 6 in FIG. 18. The oil flow leaves cavity 208 and again enters indexer core 200, as shown by Arrow 7 in FIG. 18. The oil leaves indexer core 200 as shown by Arrows 8 in FIG. 18 where it is directed through a filter (not shown) and an oil cooler (not shown) before it is redirected back into indexer core 200 as shown by Arrow 1 in FIG. 18. A tuning-fork-shaped oil cap 210 covers slot 202, slots 204 and passageway 206; and an oil lid 212 covers cavity 208. Oil cap 210 also acts as seal 188.

Advantages

The present invention provides the art with an invention that greatly improves performance with low fuel consumption and emissions. Some, but not all, of the advantages of the engine of the present invention are:

Rotary and indexing motion instead of reciprocating motion.

8.3% improved thermodynamic efficiency due to low surface to volume (s/v ratio).

14% additional work, primarily from the extended expansion (Atkinson cycle).

30% compression boost delivering 47% more work when 30% more fuel is used.

Displacement on demand delivering up to 33% fuel savings.

Broad operating range from 125 rpm to 8000 rpm, possibly negating the need for gearboxes.

10–15% GDI performance advantage (sfc or power) due to throttleless induction and stratified mode at low loads.

Low weight comparable to aero IC engines.

Very compact size.

No couple moments or torsional vibration.

Low part count and complexity with no valve gear, crankshaft or con rods.

Low friction by exclusive use of rolling element bearings.

58% reduction in friction and pumping losses.

Active direct injection (ADI) for improved transient response and minimal surface wetting.

No on-cost air injection reduces HC, CO and $CO_2$ emissions.

Ultra low emissions.

Up to 5% efficiency improvement due to controllable fuel spray pattern.

2× faster combustion duration due to twin spark plugs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An internal combustion engine comprising:

a housing defining a single combustion chamber;

a fuel injector rotatably disposed with respect to said housing and in communication with said combustion chamber, said fuel injector being movable rotatively between a first and a second position, said fuel injector spraying fuel to a first location when in said first position, and said fuel injector spraying fuel to a second location when in said second position, said second position being different than said first position.

2. An apparatus comprising:

a housing;

a first disc rotatably disposed with respect to said housing, said first disc defining a first and a second slot;

a second disc rotatably disposed with respect to said housing;

a first pin mounted to said second disc;

a third disc rotatably disposed with respect to said housing, said first disc being disposed between said second and third discs; and a second pin mounted to said third disc;

wherein rotation of said first, second and third discs with respect to said housing causes said first pin to engage said first slot to define a first compression chamber between said first pin and said first disc and said second pin to engage said second slot to define a second compression chamber between said second pin and said first disc.

3. The apparatus according to claim 2 further comprising:

a first trap plate disposed on a first side of said first disc; and a second trap plate disposed on a second side of said first disc, said first and second trap plates sealing said first and second compression chambers when said first pin engages said first slot and said second pin engages said second slot.

4. The apparatus according to claim 2 wherein said first disc defines a tunnel in communication with said first and second slot.

5. The apparatus according to claim 4 further comprising a single fuel injector disposed within said tunnel.

6. The apparatus according to claim 5 wherein said fuel injector is disposed along an axis of rotation of said first disc.

7. The apparatus according to claim 5 wherein said injector is rotatably disposed with respect to said first disc.

8. The apparatus according to claim 5 wherein said fuel injector is movable between a first position and a second position, said fuel injector spraying fuel to a first location when in said first position, said fuel injector spraying fuel to a second location when in said second position, said second position being different than said first position.

9. The apparatus according to claim 5 further comprising a single spark initiator in communication with said first and second combustion chambers.

10. The apparatus according to claim 2 further comprising a single fuel injector in simultaneous communication with said first and second combustion chambers.

11. The apparatus according to claim 10 further comprising a first spark initiator in communication with said first combustion chamber and a second spark initiator in communication with said second combustion chamber.

12. The apparatus according to claim 2 further comprising a first spark initiator in communication with said first combustion chamber and a second spark initiator in communication with said second combustion chamber.

13. The apparatus according to claim 2 wherein said first and second pins each comprise a porous metal pin.

14. The apparatus according to claim 2 wherein said first compression chamber is in communication with second compression chamber.

15. An apparatus comprising:

a housing;

a first disc rotatably disposed with respect to said housing, said first disc defining a first, a second, a third and a fourth slot;

a second disc rotatably disposed with respect to said housing;

a first and second pin mounted to said second disc;

a third disc rotatably disposed with respect to said housing, said first disc being disposed between said second and third discs; and a third and fourth pin mounted to said third disc;

wherein rotation of said first, second and third discs with respect to said housing causes said first pin to engage said first slot to define a first compression chamber between said first pin and said first disc, said second pin to engage said second slot to define a second compression chamber between said second pin and said first disc, said third pin to engage said third slot to define a third compression chamber between said third pin and said first disc and said fourth pin to engage said fourth slot to define a fourth compression chamber between said fourth pin and said first disc.

16. The apparatus according to claim 15 wherein said first and second slots are disposed opposite to each other.

17. The apparatus according to claim 15 further comprising:

a first trap plate disposed on a first side of said first disc; and a second trap plate disposed on a second side of said first disc, said first and second trap plates sealing said first compression chamber when said first pin engages said first slot, sealing said second compression chamber when said second pin engages said second slot sealing said third compression chamber when said third pin engages said third slot and sealing said fourth compression chamber when said fourth pin engages said fourth slot.

18. The apparatus according to claim 15 wherein said first disc defines a first tunnel in communication with said first and third slots and a second tunnel in communication with said second and fourth slots.

19. The apparatus according to claim 18 further comprising a single fuel injector disposed within said first and second tunnels.

20. The apparatus according to claim 19 wherein said fuel injector is disposed along an axis of rotation of said first disc.

21. The apparatus according to claim 19 wherein said injector is rotatably disposed with respect to said first disc.

22. The apparatus according to claim 19 wherein said fuel injector is movable between a first position and a second position, said fuel injector spraying fuel to a first location when in said first position, said fuel injector spraying fuel to a second location when in said second position, said second position being different than said first position.

23. The apparatus according to claim 19 further comprising a first spark initiator in communication with said first compression chamber, a second spark initiator in communication with said second compression chamber, a third spark initiator in communication with said third compression chamber and a fourth spark initiator in communication with said fourth compression chamber.

24. The apparatus according to claim 15 further comprising a single fuel injector in communication with said first and second combustion chambers.

25. The apparatus according to claim 24 further comprising a first spark initiator in communication with said first compression chamber, a second spark initiator in communication with said second compression chamber, a third spark initiator in communication with said third compression chamber and a fourth spark initiator in communication with said fourth compression chamber.

26. The apparatus according to claim 15 further comprising a first spark initiator in communication with said first compression chamber, a second spark initiator in communication with said second compression chamber, a third spark initiator in communication with said third compression chamber and a fourth spark initiator in communication with said fourth compression chamber.

27. The apparatus according to claim 15 wherein each of said first through fourth pins comprises a porous metal pin.

28. The apparatus according to claim 15 wherein:

a fifth and sixth pin are mounted to said second disc; and rotation of said first, second and third discs with respect to said housing causes said fifth pin to engage said third slot to define a fifth compression chamber between said fifth pin and said first disc, and said sixth pin to engage said fourth slot to define a sixth compression chamber between said sixth pin and said first disc.

29. The apparatus according to claim 28 wherein said first and second slots are disposed opposite to each other and said third and fourth slots are disposed opposite to each other.

30. The apparatus according to claim 28 further comprising:

a first trap plate on a first side of said first disc; and a second trap plate disposed on a second side of said first disc, said first and second trap plates sealing said compression chambers when a respective pin engages a respective slot.

31. The apparatus according to claim 28 wherein said first disc defines a first tunnel in communication with said first and second slots and a second tunnel in communication with said third and fourth slots.

32. The apparatus according to claim 31 further comprising a first fuel injector disposed within said first tunnel and a second fuel injector disposed within said second tunnel.

33. The apparatus according to claim 32 wherein said first and second fuel injectors are disposed along an axis of rotation of said first disc on opposite sides of said first disc.

34. The apparatus according to claim 32 wherein said first and second fuel injectors are rotatably disposed with respect to said first disc.

35. The apparatus according to claim 32 wherein each fuel injector is movable between a first position and second position, each fuel injector spraying fuel to a first location when in said first position and each fuel injector spraying fuel to a second location when in said second position, said second position being different than said first position.

36. The apparatus according to claim 32 wherein each combustion chamber is in communication with a spark initiator.

37. The apparatus according to claim 28 further comprising a first fuel injector in simultaneous communication with said first and second compression chambers, and a second fuel injector in simultaneous communication with said third and fourth compression chambers.

38. The apparatus according to claim 37 wherein each combustion chamber is in communication with a spark initiator.

39. The apparatus according to claim 28 wherein each combustion chamber is in communication with a spark initiator.

40. The apparatus according to claim 15 wherein each of said first and second pins comprise a porous metal pin.

* * * * *

UNITED STATES PATENT AND TRADEMARK OFFICE
CERTIFICATE OF CORRECTION

PATENT NO. : 6,877,476 B1
DATED : April 12, 2005
INVENTOR(S) : Ross Bradsen

It is certified that error appears in the above-identified patent and that said Letters Patent is hereby corrected as shown below:

<u>Column 12,</u>
Line 14, "Co" should be -- CO --

Signed and Sealed this

Twenty-eighth Day of June, 2005

JON W. DUDAS
*Director of the United States Patent and Trademark Office*